United States Patent Office 3,148,029
Patented Sept. 8, 1964

3,148,029
PROCESS FOR PREPARING DIBORANE
George H. Kalb, Landenberg, Pa., assignor to E. I. du Pont de Nemours and Company, Wilmington, Del., a corporation of Delaware
No Drawing. Filed Dec. 5, 1958, Ser. No. 778,328
8 Claims. (Cl. 23—204)

This invention relates to the preparation of boron compounds and more particularly to boron hydrides.

Diborane, $B_2H_6$, is a basic chemical in boron chemistry since almost every boron compound of importance can be directly obtained from it. Diborane can be pyrolyzed under controlled conditions to form boron or boride coatings on metals or ceramics. Furthermore, diborane and higher boron hydrides are useful as high energy fuels.

Various methods have been proposed for preparing diborane and higher boron hydrides. However, the older methods possess certain deficiencies. It is, therefore, an object of this invention to provide a new and improved method for preparing these hydrides which is suitable for operation on a large scale. A further object is the provision of an improved method for preparing diborane and higher boron hydrides from readily available low cost raw materials. Still another object is to provide a method for preparing a white solid having the empirical formula HBO.

These and other objects are accomplished by provision of a process which comprises heating a mixture of boron, boron carbide, or boron nitride and granular silica with hydrogen at a temperature between 950° and 2000° C., preferably between 1050° and 2000° C. In addition to the boron hydrides, there is also produced in this process a white solid having the empirical formula HBO, which readily decomposes to diborane.

It will be understood that silica is an essential component of the reaction mixture. While the silica can be used in a wide range of proportions, it is preferably used in at least a stoichiometric amount, i.e., at least one silica molecule for each boron atom in the reaction zone. The use of lower proportions of silica results in lower yields of the desired boron hydrides. The silica must be in a granular form. Silica particles capable of passing through an 8-mesh, or finer, standard screen can be used. Preferably, finely divided silica is used since the smaller the particle size the more rapid is the reaction.

The pressure under which the reaction of the boron reactant, silica and hydrogen is carried out is not critical. Pressures ranging from subatmospheric to superatmospheric can be used. However, it is preferred for ease of operation to carry out the reaction at atmospheric pressure.

The reaction time required to convert the boron reactant to diborane and other boron hydrides is dependent on several factors, e.g., the particular boron reactant, the operating temperature employed, and the state of subdivision of the boron reactant and the silica. The last two factors have a major effect on the reaction time. In general, the higher operating temperatures in the range specified above require the shorter reaction times. Similarly, the finer the particle size of the boron reactant and the silica, the shorter the reaction time required. Thus, the reaction times can range from a few hours, e.g., 1–5 hours, at the higher temperatures and with finely divided reactants up to 40 or 50 hours at the lower temperatures and with the coarser reactants.

An amount of hydrogen equivalent to the theoretical amount required to react with all the boron to form diborane is employed in the process. However, it is preferred to use an excess of hydrogen in order to obtain more rapid and complete conversion of the boron compound to the desired boron hydrides. The excess hydrogen also serves to assist in the removal of diborane and other volatile boron hydrides from the reaction zone. It is desirable to remove the boron hydrides from the reactoin zone as rapidly as possible in order to minimize the decomposition of diborane to higher boron hydrides and to metallic boron which takes place at the high temperatures of the reaction zone.

The boron reactants, silica and hydrogen, used in this process can be of the grades of these materials commonly available. However, they should be free of moisture since any water present will hydrolyze diborane formed in the reaction to boric oxide and hydrogen and thus decrease the yield of the desired boron hydride products. Commercial hydrogen is conveniently dried by passing it over activated alumina followed by passage through a trap cooled by liquid nitrogen before passing it into the reaction zone.

Any convenient type of silica which is not hydrated, and which is in a granular form can be used in the process of this invention. Examples of such types of silica include quartz, powdered glass, and any of the silica minerals in a granular or finely divided form. Finely divided alumina containing substantial amounts of $SiO_2$, e.g., 10% $SiO_2$, can also be used. Alumina containing $SiO_2$ is especially advantageous for use when operating at temperatures above the softening point of silica. Such alumina-silica mixtures prevent plugging of the reaction tube and the alumina acts in effect as a support for the silica.

The process of this invention is conveniently carried out by passing a stream of dry hydrogen over a mixture of the granular boron reactant and silica in an inert container, e.g., a flat, fused alumina container, placed in a cylindrical reaction chamber, e.g., a fused alumina tube, heated to the desired temperature, preferably at 1050° to 2000° C. The exit gases are passed immediately through traps cooled to low temperatures, e.g., to the temperature of liquid nitrogen, to condense the boron hydrides that are formed. As indicated above, the reaction is preferably carried out at atmospheric pressure. The composition of the reaction products in the cold trap is conveniently determined by means of mass spectrometric analysis. The diborane and other boron hydrides obtained can be isolated from the crude reaction products by low temperature fractional distillation.

In another embodiment of the process, a vertical cylindrical reaction vessel can be packed with a mixture of the granular boron reactant and granular silica, and a stream of hydrogen passed upward through the reaction mixture maintained at desired operating temperature. The exit gases from this reaction system can be collected and isolated as described in the preceding paragraph.

The reaction of the boron reactant with silica and hydrogen can be carried out in apparatus constructed of any material that is inert to the reactants and products and capable of withstanding the operating temperatures and pressures. Reaction vessels made of fused alumina are satisfactory.

The process of this invention is illustrated in further detail by the following examples.

*Example I*

A quartz tube fitted inside an impervious alumina tube is charged with 5.6 g. of powdered boron carbide mixed with 25.7 g. of granular quartz of a particle size that passes through standard 8–14 mesh screens. Hydrogen from a commercial cylinder (dried over activated alumina and passed through a trap cooled in liquid nitrogen) is passed through the boron carbide-silica mixture maintained at 1230°–1250° C. The hydrogen flow is maintained at 150–170 liters/hour. Within 40 hours' reaction time, the boron carbide is entirely consumed and there is obtained in the liquid nitrogen-cooled trap through which the exit gases are passed a mixture of condensable gases which analysis by mass spectrometer indicates to contain 60–63% diborane, 32–35% silane, 0.5–1.3% higher boranes and 1% maximum of hydrogen. This amount of diborane corresponds to a 7% conversion of boron carbide to diborane.

The importance of silica in producing good conversions to diborane in the process of this invention is shown by the following experiment. A total of 5.0 g. of boron carbide is supported on carbon chips and placed in a reaction vessel made of carbon and enclosed in a fused alumina tube. The charge is heated at 1230–1250° C. with hydrogen passing over the mixture at approximately 150 liters/hour. Over a period of 120 hours there is obtained only 0.85% conversion of boron carbide to diborane. This small amount of diborane may have been formed from boron carbide because of $SiO_2$ impurities known to be present in the boron carbide.

*Example II*

An alumina tube is charged with 2.48 g. of powdered boron nitride and 18.54 g. of 8–14 mesh granular alumina containing approximately 10% $SiO_2$ by analysis. The tube is mounted vertically in an electric furnace. The center of the tube containing the boron nitride is positioned so that it is located in the hottest part of the furnace, which is maintained at 1375–1400° C. Hydrogen gas which has been dried previously by passing over activated alumina is passed upward through the boron nitride bed at a flow-rate of 110–120 liters/hour. The exit gases from the reaction tube are led through three traps immersed in liquid nitrogen. After a total reaction time of 23 hours there is obtained 7.8 millimoles of condensed gas which analyzes (by mass spectrometer) 48–50% diborane, 31–33% silane, 10–12% nitrogen, and 7.7% hydrogen. The diborane obtained corresponds to a 7.8% conversion of boron nitride to diborane. An additional 5.8% conversion of diborane is obtained by decomposition of the intermediate white solid product having the empirical formula HBO.

The importance of the silica contained in the alumina used in the preceding example is shown by the following experiment. When the procedure of Example II is repeated with the exception that pure alumina containing less than 50 parts per million of $SiO_2$ is used in a mixture with the powdered boron nitride and the exit gases from the reaction are burned, the green color of the flame obtained from the exit gases indicates that the amount of diborane being formed is less than 5 parts per million and after approximately 2 hours operation the green color disappears entirely.

*Example III*

A quartz tube 1" in diameter and 24" long is charged with 4 g. of powdered boron admixed with 25.7 g. of quartz sand (8–14 mesh particle size). The tube and its contents are heated at 1100–1200° C. while hydrogen (which has previously been dried by passing over activated alumina) is passed through the mixture at a rate of about 80 liters/hour. The exit gases from the reaction tube are burned. The reaction is continued for a period of 17 hours and during this time a strong, green flame is observed which indicates the presence of diborane in the reaction gases.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for preparing boron hydrides which comprises passing a stream of dry hydrogen gas through a reaction zone containing a mixture of granular silica and a granular boron material selected from the group consisting of boron, boron carbide, and boron nitride, said hydrogen being present in at least the amount required to form diborane, while heating said mixture to a temperature of 950° C. to 2000° C. and isolating from the exit gases the volatile boron hydrides formed.

2. A process according to claim 1 wherein the boron hydrides formed are rapidly removed from the reaction zone with the exit gases.

3. A process according to claim 1 wherein the hydrogen is present in molecular excess of the amount required to form diborane and the exit gases are cooled in a cooling zone maintained at the temperature of liquid nitrogen.

4. A process according to claim 1 wherein the volatile boron hydrides formed are isolated from the reaction products by low temperature fractional distillation.

5. A process according to claim 1 wherein the granular silica and the boron in the granular boron material are present in a ratio of at least one silica molecule for each boron atom in the reaction zone.

6. A process according to claim 1 wherein said granular boron material is boron carbide and said granular silica is quartz, and a temperature of 1050° C. to 2000° C. is used.

7. A process according to claim 1 wherein said granular boron material is boron nitride and said granular silica is quartz, and a temperature of 1050° C. to 2000° C. is used.

8. A process according to claim 1 wherein said granular boron material is boron and said granular silica is quartz, and a temperature of 1050° C. to 2000° C. is used.

References Cited in the file of this patent

UNITED STATES PATENTS

| | | |
|---|---|---|
| 2,469,879 | Hurd | May 10, 1949 |
| 2,888,355 | Taylor | May 26, 1959 |
| 2,918,352 | Kanda et al. | Dec. 22, 1959 |
| 2,946,662 | Mosely | July 26, 1960 |

FOREIGN PATENTS

| | | |
|---|---|---|
| 539,758 | Belgium | July 30, 1955 |
| 792,017 | Great Britain | Mar. 19, 1958 |

OTHER REFERENCES

Van Nostrand's Chemist's Dictionary, Van Nostrand, copyright 1953, page 93.

Uno: J. of Sci. Research Inst., Tokyo, vol. 47, pages 216–222, December 1953.

Schechter: "Boron Hydrides and Related Compounds," Callery Chem. Co., Second Edition, pages 9–12, May 1954.

Koster: Angewandte Chemie, 69, pp. 94, 95 (1957).

Brady et al.: A.S.T.I.A. Tech Abstr. Bull. U58–16, 2960 (October 15, 1958).

Hurd: "J.A.C.S.," vol. 71, pages 20–22, January 1949.

Hurd: "Chemistry of the Hydrides," page 65 (1952).